(12) United States Patent
Tagusari

(10) Patent No.: US 8,137,040 B2
(45) Date of Patent: Mar. 20, 2012

(54) LOCK NUT

(75) Inventor: Eiko Tagusari, Souka (JP)

(73) Assignee: Hokuetsu Printing Company Limited, Tokyo (JP)

( * ) Notice: Subject to any disclaimer, the term of this patent is extended or adjusted under 35 U.S.C. 154(b) by 1581 days.

(21) Appl. No.: 10/568,272

(22) PCT Filed: Jul. 28, 2004

(86) PCT No.: PCT/JP2004/010699
§ 371 (c)(1),
(2), (4) Date: Sep. 21, 2006

(87) PCT Pub. No.: WO2005/019663
PCT Pub. Date: Mar. 3, 2005

(65) Prior Publication Data
US 2011/0097175 A1   Apr. 28, 2011

(30) Foreign Application Priority Data

Aug. 22, 2003   (JP) ................................ 2003-208390

(51) Int. Cl.
*F16B 39/12*  (2006.01)
(52) U.S. Cl. .................. 411/222; 411/223; 411/242
(58) Field of Classification Search .................. 411/222, 411/223, 225, 226, 242, 276, 277, 278, 280
See application file for complete search history.

(56) References Cited

U.S. PATENT DOCUMENTS

| | | | |
|---|---|---|---|
| 502,477 A * | 8/1893 | Tolan et al. ................ | 411/242 |
| 985,826 A * | 3/1911 | McLaughlin ................ | 411/278 |
| 2,393,520 A * | 1/1946 | Crowther .................... | 411/276 |
| 2,551,102 A * | 5/1951 | Delaney ...................... | 411/277 |
| 2,592,129 A * | 4/1952 | Engstrom .................... | 470/19 |
| 3,971,085 A * | 7/1976 | Mount ......................... | 470/19 |
| 4,069,854 A * | 1/1978 | Heighberger ................ | 411/277 |
| 6,113,329 A * | 9/2000 | Moroi et al. ................ | 411/223 |

FOREIGN PATENT DOCUMENTS

| GB | 170411 | 10/1921 |
|---|---|---|
| GB | 238487 | 8/1925 |

(Continued)

OTHER PUBLICATIONS

Supplementary European Search Report for Application No. EP 04 77 0962 dated Oct. 6, 2006.
Notice of Reasons of Rejection mailed Jun. 7, 2005 for the corresponding Japanese Patent Application No. 2003-208390. Partial English translation is attached.

(Continued)

*Primary Examiner* — Victor Batson
*Assistant Examiner* — James Cline, Jr.
(74) *Attorney, Agent, or Firm* — Edwards Wildman Palmer LLP

(57) ABSTRACT

A lock nut capable of improving a fastening force of a fastening nut and the lock nut is provided. The lock nut includes a body having a threaded throughhole and a groove formed at a circumferential edge thereof. A plurality of projections are formed in the groove and each includes an outer side face directed toward a center of the body from a border between a seat surface and the groove. An inner side face serves as an extension of an inner face of the threaded throughhole. A depth of the groove is such that if the projections are crushed when the lock nut is fastened against a bolt, they do not enter a space between a seat surface on the side of the body of the fastening nut and the seat surface of the lock nut body.

20 Claims, 5 Drawing Sheets

FOREIGN PATENT DOCUMENTS

| | | |
|---|---|---|
| GB | 617597 | 2/1949 |
| JP | 36-15533 | 6/1961 |
| JP | 47-39383 | 10/1972 |
| JP | 55-110820 | 1/1979 |
| JP | 57-113709 | 12/1980 |
| JP | 10-2317 | 1/1998 |
| JP | 10-61645 | 3/1998 |
| JP | 11-315820 | 11/1999 |

OTHER PUBLICATIONS

Notice of Reasons of Rejection mailed Aug. 30, 2005 for the corresponding Japanese Patent Application No. 2003-208390. Partial English translation is attached.

Notice of the Decision of Final Rejection mailed Jan. 17, 2006 for the corresponding Japanese Patent Application No. 2003-208390. Partial English translation is attached.

* cited by examiner

LOCK NUT

BACKGROUND OF THE INVENTION

1. Field of the Invention

The present invention relates to a double nut for use in fastening two nuts against a bolt in order to fix various kinds of machine devices or iron frames of a building or the like. In particular, it relates to an outside lock nut which is overlapped on a fastening nut so as to prevent the fastening nut from being loosened.

2. Description of the Prior Art

A bolt and a nut for use in fastening component parts to various kinds of machine devices in the prior art or a bolt and a nut used in the case of fixing an iron frame of a building or the like are gradually loosened by vibration or the like of a fastened member.

In view of this fact, there have been various kinds of means widely adopted for preventing looseness of such a nut as above. For example, there is provided a "spring washer," wherein part of the washer is cut and a resilient force is added. In place of this spring washer, it is also possible to apply a "toothed washer," wherein projections are embossed on a fastening surface. In addition, it is also possible to apply a "pin member" such as a split pin in which a pin is passed through a nut. The pin member is applied such that common through-pass holes are arranged in a threaded part of a bolt and the nut in their radial direction, and the pin is inserted into these through-pass holes. Further, there is provided a "double-nut." The double nut is operated such that another looseness preventive nut is overlapped on a fastening nut against a bolt and only the outer nut is further fastened forcedly, using a fastening effect between both the nuts and friction between fastening surfaces.

It can be expected that the aforesaid prior art "spring washer" may provide an effect of preventing looseness just after its fastening. However, since its use of longer period causes a resilient force of the spring washer to be decreased and an effect of preventing looseness to be reduced, this prior art nut had a problem that the nut is not suitable for fastening a heavy iron frame or the like. Similarly, although it could be expected that the "toothed washer" may provide an effect of preventing looseness against a small-sized machine device or a fastening component whose material is soft, as compared with a metallic product, like a wooden product, it could not be expected that an effect of preventing looseness is attained for a large-sized metallic machine device or the like.

In addition, the "pin member" is applied such that there are provided through-pass holes common to the threaded part of the bolt and the nut in their radial direction. Accordingly, when another nut is fastened, if an axial center of each of the through-pass holes does not coincide with each other, the pin may not be passed through the through-pass holes. Further, when the nut was fastened against the bolt in such a way that the axial center of each of the through-pass holes coincided with each other, it showed a problem that they were fastened in loosened state, resulting in that they could not be forcedly fastened.

In addition, when the "double nut" was fastened at one location, it was necessary to fasten nuts twice and an operating step for further fastening the outer nut was added, resulting in quite a troublesome fastening step. In particular, a building or the like requiring a large amount of nut fastening operations had a problem that the fastening steps might become a cause to delay a completion of work. Also, the work for confirming it individually whether or not the looseness preventive outer nut was forcedly fastened was troublesome.

In view of the above, the following patent documents disclose the art for preventing a fastening nut from being loosened by fastening the fastening nut by a lock nut.

Patent Document 1: Japanese Utility Model Unexamined Publication No. Sho 55 (1980)-110820

Patent Document 2: Japanese Patent Unexamined Publication No. Hei 10 (1998)-61645

Namely, the patent document 1 discloses a lock nut "integrally formed with projections projecting outwardly from the vicinity of the threaded hole of the end face on the fastening side of the nut, the projections being made of a resilient member at least softer than the nut." However, this lock nut is the one in which the projections are simply provided on the end face on the fastening side of the nut. Therefore, when the fastening nut is fastened by the lock nut, the projections enter the space between the end face of the fastening nut and the end face on the fastening side of the lock nut, which produces a clearance there, reducing a fastening force of the fastening nut and the lock nut.

In view of the above problem, the present inventor developed a lock nut according to the patent document 2 wherein "a seat surface of a circumferential edge of a threaded hole of the nut is formed with a plurality of projections, wherein the nut is fastened against a fastening nut already fastened to a bolt of a member to be fastened with its projecting side being faced against the former nut, the projections to be deformed between the seat surfaces of both nuts are applied around the threaded portions of the threaded holes of both nuts and the threaded part of the bolt, to enable a looseness of both nuts to be prevented." When the nut is fastened against the bolt, these projections and their deformed portions are crushed to increase a frictional force caused by biting of the projections into the threaded part of the bolt, improving an effect of preventing looseness.

However, a problem to be solved is also found in this lock nut. Namely, when the fastening nut is fastened with the lock nut, part of the projections formed on the seat surface may enter the space between the seat surface of the fastening nut and the seat surface of the lock nut, which disturbs the effective use of the fastening force of the fastening nut and lock nut.

The present invention has been invented in view of the aforesaid problem and it is an object of the present invention to provide a lock nut in which a force of fastening between the fastening nut and the lock nut is increased.

SUMMARY OF THE INVENTION

A lock nut according to the present invention is for preventing a fastening nut fastened against a bolt from being loosened, the lock nut comprising:

a nut body having a groove formed continuously and concentrically from a circumferential edge of a threaded hole of one seat surface and a plurality of projections formed in the groove, wherein each projection is made from the same material as that of the nut body and has an outer side face extending in a tilted manner from the border between the seat surface and the groove of the nut body toward a center of the nut body and an inner side face being an extension of an inner face of the threaded hole; and wherein a depth of the groove is made such that the projection crushed when the nut body is threadably engaged with the bolt and fastened against it by the fastening nut does not enter the space between a seat surface of the fastening nut and the seat surface of the nut body.

An extremity of the projection may be formed with a claw directed toward the center of the nut body.

The projection may have a screw thread being formed on the inner side face and threadably engaged with a threaded part of the bolt.

The fastening nut is connected to the side of the projections of the nut body and a height of the projection may be set so that a lead angle and a pitch clearance of the threaded hole of the nut body coincide with a lead angle and a pitch clearance of a threaded hole of the fastening nut.

The height of the projection may be equal to or more than 30% of a length of the nut body in the direction of its central axis.

The projection may have a tapered mountain-shape form.

The lock nut according to the present invention has following effects.

(1) Since a plurality of projections is formed in the groove made in the seat surface of the nut body, when the lock nut is fastened with its projections being faced against a seat surface of the fastening nut, the crushed projections are merged into threadedly engaged portions between the threaded part of the bolt and the threaded holes of both the nuts. Further, the crushed projections do not enter the space between the seat surface of the nut body and the seat surface of the fastening nut. Therefore, an effect of preventing looseness can considerably be improved.

(2) By forming a plurality of projections using the same material as that of the nut body, the manufacturing process can be simplified. In addition to metallic materials, the nut body can be made from a synthetic resin according to its usage purpose.

(3) Since the extremity of the projection is formed with the claw directed toward the center of the nut body, a frictional force between the threaded hole of the nut body and the threaded part of the bolt is further increased and an effect of preventing looseness can be improved.

(4) A screw head threadably engaging with the threaded part of the bolt is formed on the inner side face of the projection. Therefore, the projection can easily be crushed. Further, part of the projection can easily be applied around the threaded part of the bolt, which brings about a positive looseness-preventive effect of the lock nut.

(5) In the case where the fastening nut is connected to the lock nut in advance, if the lock nut is separated from the fastening nut and the seat surfaces of the nut body are closely contacted to each other, this closely contacted state shows that the looseness-preventive action (twice fastening operation) is already completed. Therefore, it is easy to check whether or not the twice fastening of the double nut is forgotten.

(6) By setting the height of the projection to a size equal to or more than 30% of the length of the nut body in the direction of its central axis, an effect of preventing looseness can be improved.

DESCRIPTION OF THE PREFERRED EMBODIMENTS

Figure 1:
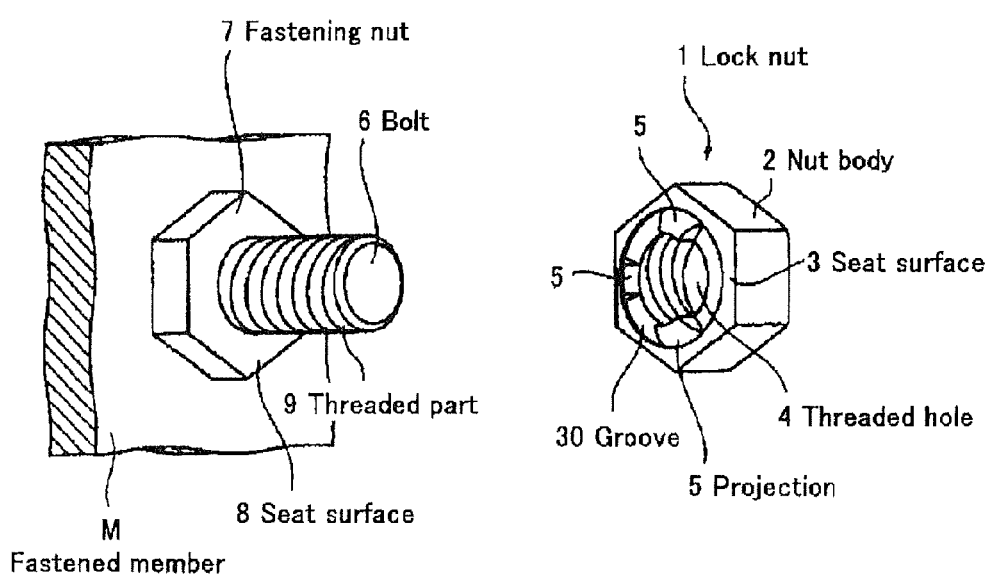
FIG. 1 is a perspective view for showing a lock nut of a first embodiment of the present invention.

Referring now to the accompanying drawings, some preferred embodiments of the lock nut of the present invention will be described.

First Embodiment

FIGS. 1 to 6 illustrate the lock nut of the first embodiment of the present invention. The lock nut 1 of the present embodiment is constructed such that a seat surface 3 of a nut body 2 such as a hexagonal nut, for example, having a predetermined lead angle and a pitch clearance as a so-called "female thread" is formed with a groove 30 at a circumferential edge of a threaded hole 4 and three projections 5 in equal spaced-apart relation in the groove 30. The projections 5 are of the same material as the nut body 2.

A wide variety of materials can be used in making the lock nut 1 according to its usage purpose and size. For example, a metallic lock nut 1 is made from materials such as steel, stainless steel, copper, and brass. Further, a synthetic-resin lock nut 1 is made from materials such as polyvinyl chloride, polycarbonate resin, polyacetal resin, ABS resin, and urea resin.

Figure 2:
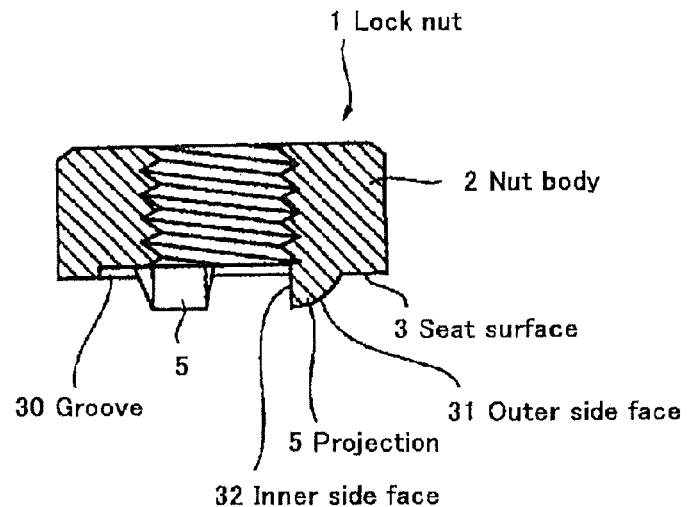
FIG. 2 is a side elevational view in section for showing the lock nut of the first embodiment of the present invention.
Figure 3:
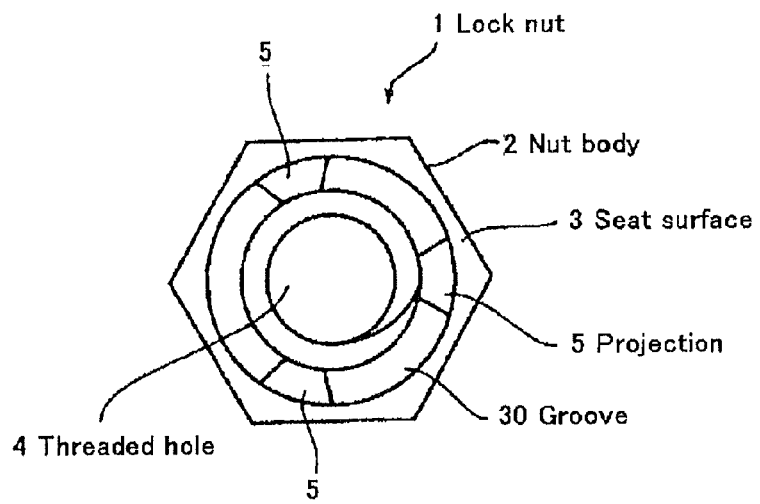
FIG. 3 is a bottom view for showing the lock nut of the first embodiment of the present invention.
Figure 4:
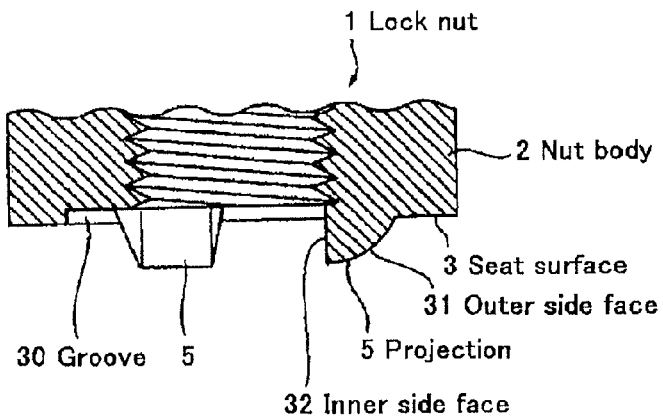
FIG. 4 is an enlarged side elevational view in section for showing a projection of the lock nut of the first embodiment of the present invention.

The projection 5 has a tapered mountain-shaped form. However, an outer side face 31 on the opposite side of the threaded hole 4 is, as shown in FIGS. 2 to 4, directed toward a center of the nut body 2 from the border between the seat surface 3 and the groove 30 of the nut body 2. Also, an inner side face 32 on the side of the threaded hole 4 is so made that its extension arrives at about a midpoint between a root and a crest of the thread groove of the nut 2.

As the lock nut 1 is fastened against the bolt 6 already fastened which has been inserted into a fastened member M and fastened by the fastening nut 7, the projections 5 formed on the lock nut 1 are crushed between a seat surface 8 of the fastening nut 7 and the groove 30 formed in the nut body 2. In this regard, as described above, the inner side face 32 of the projection 5 is so made as to be an extension of an inner face of the threaded hole 4 of the nut body 2, and has a large contact area with the threaded part 9 of the bolt 6. Therefore, part of the crushed projection 5 is fastened in such a way that it is applied around the threaded part 9 of the bolt 6. In this way, the projections 5 can apply a certain influence against a frictional force of the threaded part 9 of the bolt 6 and the threaded hole 4 of the lock nut 1.

In this regard, if each of these projections 5 is too small, it is not to be applied around the threaded part 9 of the bolt 6 when it is fastened against the bolt 6 and may not act as a looseness-preventive member. To the contrary, if it is too large, as described in regard to the lock nut of the prior art, it may produce a large clearance between itself and the inside fastening nut 7 and may not perform a function of the double nut.

Therefore, according to the lock nut 1 of the present embodiment, a height of the projection 5 is set to be about 30% of the length of the nut body 2 in the direction of the central axis to make the projection 5 large enough so that the projection 5 is applied around the threaded part 9 of the bolt 6 when it is fastened against the bolt 6 and may act as a looseness-preventive member. Also, in order to prevent it from producing a large clearance between itself and the inside fastening nut 7 and to allow it to perform a function of the double nut, a groove 30 is formed at the circumferential edge of the threaded hole 4 of the seat surface 3 of the nut body 2 and projections 5 are formed in the groove 30. With this construction, even when the projection 5 is crushed, it enters the groove 30 so that it may not enter the space between the seat surface 8 of the fastening nut 7 and the seat surface 3 of the nut body 2. Namely, a depth of the groove 30 is set so that the crushed three projections 5 may not enter the space between the seat surface 8 of the fastening nut 7 and the seat surface 3 of the nut.

According to the present embodiment, three projections 5 are provided. However, the number of projections 5 may be properly determined in response to a size or a shape of the nut body 2. For example, in the case of a large nut body 2, it is possible to provide four or five projections 5. In turn, in the case of a small nut body 2, it is preferable that two projections 5 may be provided. However, after these projections 5 are crushed by twice fastening operations, they are fastened in such a way that part of the crushed projection 5 may be applied around the threaded part 9 of the bolt 6 so as to apply an influence against a frictional force of the threaded part 9 of the bolt 6, the threaded hole 4 of the lock nut 1 and the threaded hole 10 of the fastening nut 7. It is preferable that these projections 5 are arranged in a point symmetrical state around a central point of a central axis of the nut body 2 and the fastening nut 7 or in an equal-spaced apart relation along the circumference of the thread groove.

Figure 5A:
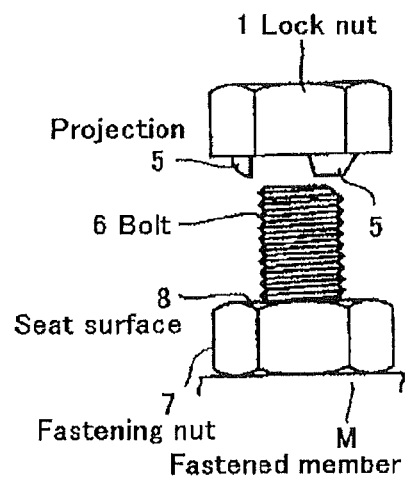
FIGS. 5(a) to 5(c) are front elevational views for showing a state in which the lock nut of the first embodiment of the present invention is fastened against the bolt, wherein FIG. 5(a) indicates a fastening nut kept under a state before the lock nut is fastened against the bolt already fastened, FIG. 5(b) indicates a state after the lock nut is fastened until the projections of the lock nut are contacted to the seat surface of the fastening nut, and FIG. 5(c) indicates a state in which the lock nut is fastened until the projections are crushed and fastened in such a way that the seat surfaces are contacted to each other.
Figure 5B:
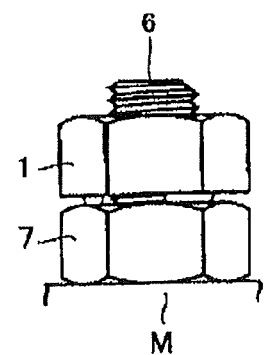
Figure 5C:
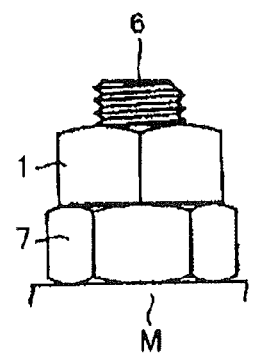

FIGS. 5(a), 5(b), and 5(c) show a state in which the lock nut 1 of the present invention is fastened against the bolt 6. First, the usual fastening nut 7 is fastened against the bolt 6 inserted into a part to be fixed to a fastened member M of a machine device or an iron frame of a building or the like. Then, the lock nut 1 of the present invention is fastened against the bolt 6 such that the projections 5 are faced against the seat surface 8 of the fastening nut 7 (See FIG. 5(a)). The nut is fastened until the extremity of each projection 5 of the lock nut 1 is contacted to the seat surface 8 of the fastening nut 7 (See FIG. 5(b)). In addition, as the lock nut 1 is further fastened, the projections 5 are crushed by the fastening force and the lock nut 1 can be approached to the fastening nut 7 (See FIG. 5(c)).

Figure 6:
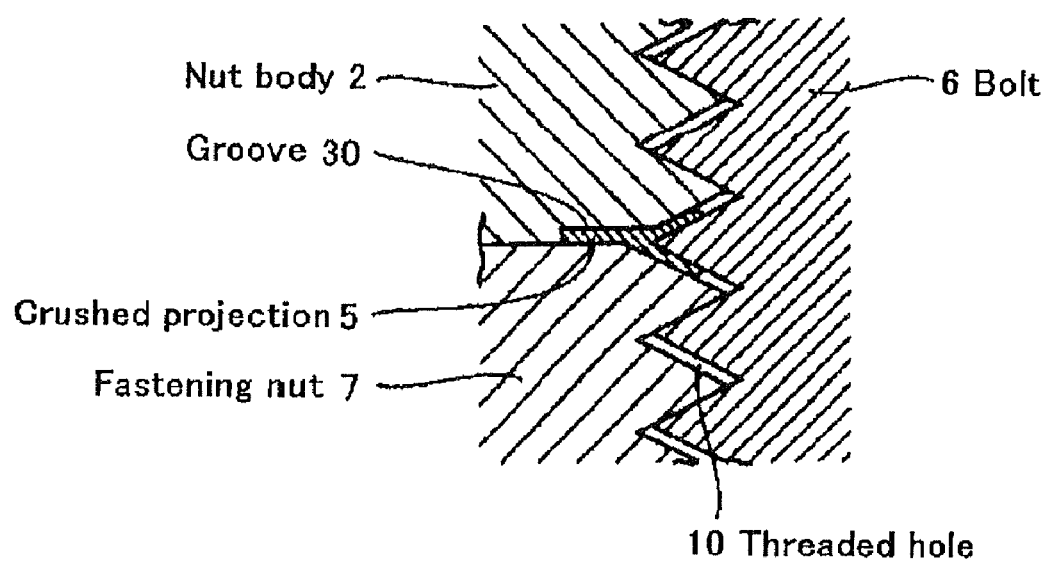
FIG. 6 is an enlarged view in section of a substantial part for showing a fastened state between a threaded part of the bolt and a threaded hole of the nut of the lock nut according to the first embodiment of the present invention.

At this time, as shown in FIG. 6, the crushed projections 5 enter the groove 30 formed in the seat surface 3 of the nut body 2 and they do not enter the space between the seat surface 3 of the nut body 2 and the seat surface 8 of the fastening nut 7, which enables the seat surface 3 of the nut body 2 to be contacted to the seat surface 8 of the fastening nut 7, considerably increasing a force fastening between the fastening nut 7 and the lock nut 1. Further, since a part of the crushed projections 5 is applied around the threaded part 9 of the bolt 6 under the crushed state, the crushed portions of the projections 5 contribute to improvement of a frictional force and an effect of looseness-prevention.

In the aforesaid preferred embodiment of the present invention, the arrangement in which the projections 5 are formed only at one seat surface 3 of the nut 1 has been described. However, these projections 5 may be formed at both the seat surfaces 3 of the nut body 2. If both the seat surfaces 3 of the nut body 2 are formed with the projections 5, it is not necessary to confirm a front surface or a rear surface of the nut body 2 when it is fastened against the bolt 6 and so it is possible to improve a fixing workability.

Second Embodiment

Figure 7:
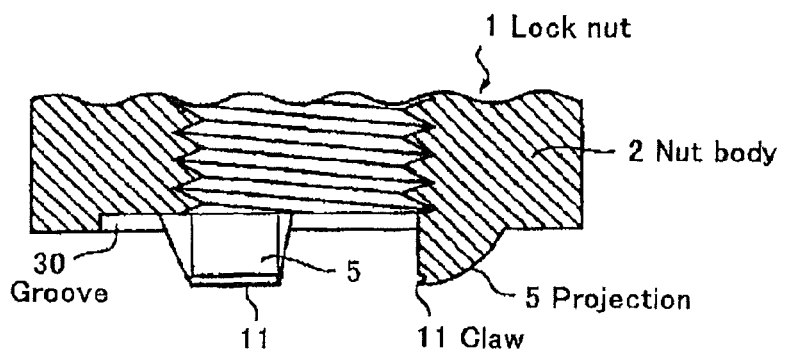
FIG. 7 is an enlarged side elevational view in section for showing a second preferred embodiment of the present invention in which the projection of the lock nut is formed with a claw.

FIG. 7 is an enlarged side elevational view in section of the lock nut according to a second embodiment of the present invention. The lock nut 1 of the present embodiment differs from the previously described lock nut 1 according to the first embodiment in that each extremity of the projections 5 is formed with a claw 11 directed toward a center of the nut body 2.

According to the lock nut 1 of the present embodiment, when the lock nut 1 is fastened against the bolt 6 in the same manner as that of the aforesaid first preferred embodiment, the projections 5 are crushed by the seat surface 8 of the fastening nut 7 and enter the groove 30, and part of each crushed projection 5 is applied around the threaded part of the bolt 6. When the projections 5 are provided with claws 11, the claws 11 are easily crushed by the seat surface 8 of the fastening nut 7 and positively applied around the threaded part 9 of the bolt 6. The claw 11 formed at the extremity of each of the projections 5 has a function to contribute to improve a frictional force of fastening between the threaded hole 4 of the nut body 2 and the threaded part 9 of the bolt 6 and to improve an effect of looseness-prevention.

Third Embodiment

Figure 8:
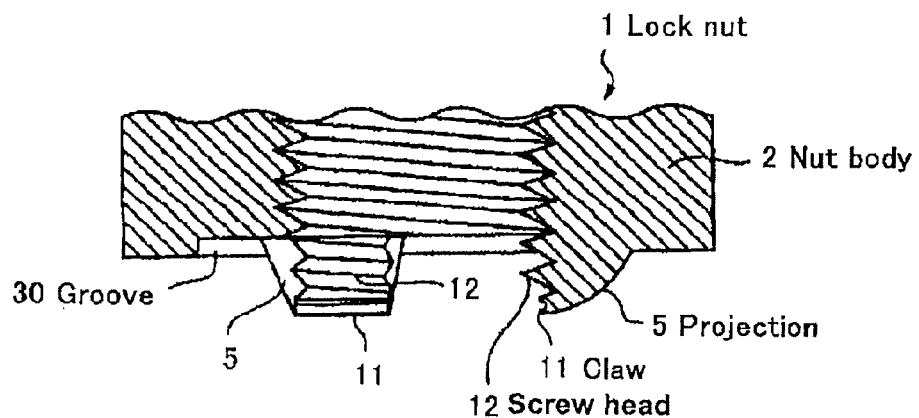
FIG. 8 is an enlarged side elevational view in section for showing a third embodiment of the present invention in which the projection of the lock nut is formed with a screw thread at its extremity.

FIG. 8 shows a lock nut according to a third embodiment of the present invention. The lock nut 1 of the present embodiment differs from the lock nut 1 of the second embodiment described above in that the projection 5 is formed with a screw thread 12 threadably engaged with the threaded part 9 of the bolt 6.

According to the lock nut 1 of the present embodiment, the projection 5 is formed with the screw thread 12 threadably engaged with the threaded part 9 of the bolt 6. Therefore, forming of the screw head 12 at each of the projections 5 enables the projection 5 to be easily crushed and further causes part of the projection 5 to be easily applied around the threaded part 9 of the bolt 6. As a result, the projection 5 formed with the screw thread 12 provides a positive looseness-preventive action against the lock nut 1.

Further, the projection 5 of the lock nut 1 of the first embodiment described above may be formed with a screw thread threadably engaged with the threaded part 9 of the bolt 6.

Fourth Embodiment

Figure 9:
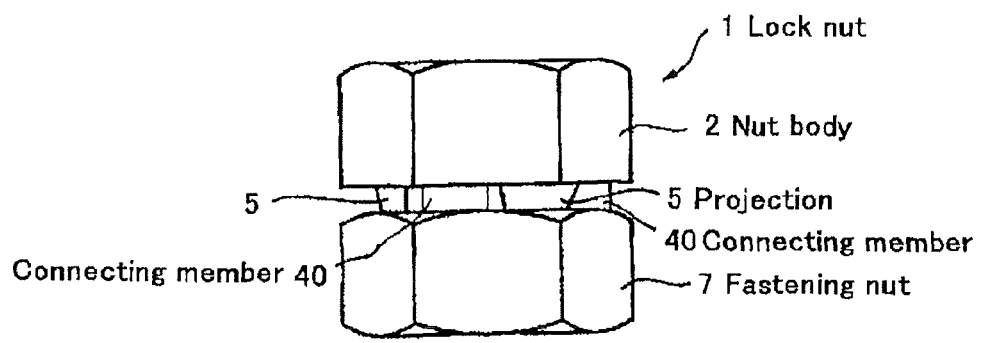
FIG. 9 is an enlarged side elevational view showing a fourth embodiment of the present invention in which the projections of the lock nut are provided with an inside fastening nut at their extremities in advance.

FIG. 9 shows a lock nut according to a fourth embodiment of the present invention. The lock nut 1 of the present embodiment differs from the lock nut 1 of the first embodiment in that the extremity of the projection 5 is fixed with a fastening nut 7 in advance.

The lock nut 1 of the present embodiment is constructed such that the fastening nut 7 is connected to the extremity of the projection 5 by spot welding or by using a connecting member 40 such as an adhesive-agent. In this regard, the lock nut 1 is connected to the fastening nut 7, in advance, by spot welding or by using the connecting member 40 such as the adhesive agent in the vicinity of the threaded holes 4, 10 of the seat surfaces 3, 8 of the two nuts 1, 7.

Further, concerning this lock nut 1, in order to fasten, concurrently, the two nuts 1,7 connected in series to a bolt 6 inserted into a fastened member M such as various machine devices or iron frames of a building or the like, the lock nut 1 and the fastening nut 7 are connected so that the nuts 1, 7 can be fastened against the bolt 6 even in a state where projections 5 are formed according to the lead angles and pitch clearances of the threaded holes 4, 10 of the nuts 1, 7. Namely, a height of the projections 5 is set so that the lead angle and pitch clearance of the threaded hole 4 of the lock nut 1 (nut body 2) coincide with the lead angle and pitch clearance of the threaded hole 10 of the fastening nut 7 even when the lock nut 1 is connected to the fastening nut 7.

The lock nut 1 having the fastening nut 7 connected thereto is operated such that two nuts 1, 7 can be fastened concurrently through one fastening operation by fastening it against the bolt 6. Then, further fastening of only the outside lock nut 1 causes the welded portion or adhesive agent between the projections 5 and the seat surface 8 of the fastening nut 7 to be broken and only the lock nut 1 can be fastened more. At this time, the separated lock nut 1 is set such that each of the projections 5 is crushed and can be fastened against the seat surface 8 of the inside fastening nut 7. This projection 5 may also be fastened against the threaded part 9 of the bolt 6 so as to contribute to improvement of a frictional force of fastening between the threaded holes 4, 10 of the nuts 1, 7 and the threaded part 9 of the bolt 6 and improve an effect of looseness-prevention, and further the fastening action can be carried out fast.

The lock nut 1 of the second and third embodiments described above is also constructed such that the fastening nut 7 is connected to the extremity of the projection 5 in advance.

Modification

In the aforesaid embodiments of the lock nut 1 of the present invention, a shape and a thickness of the hexagonal nuts 1, 7 arranged side by side have been described in reference to the hexagonal nut of the same size and same shape. However, it is satisfactory if a lock nut can be fastened against the fastening nut 7 as a double nut and have a looseness-preventive action, so that the shape of the nuts 1, 7 is not limited to hexagon. For example, it is apparent that a thin lock nut 1 may also produce an effect of looseness-prevention and various kinds of combination can be applied.

In each of the aforesaid preferred embodiments, the lock nut 1 in which a hexagonal nut is formed with the projections 5 has been described. However, if the lock nut 1 is one in which the nut is fastened against the fastening nut 7 to act as the double nut, it is not limited to a hexagonal nut. It is of course apparent that this lock nut 1 may be selected from any of a rectangular nut, an octagonal nut, and other shapes.

Further, the description has been given as to the double nut which is operated such that two nuts are fastened against a bolt to fix various kinds of machine devices or iron frames of a building or the like. However, the lock nut of the present invention may be fastened against the bolt through a washer.

Industrial Applicability

The lock nut of the present invention can be applied to a double nut wherein two nuts are fastened against a bolt to fix various kinds of machine devices or iron frames of a building or the like.

What is claimed is:
1. A lock nut comprising:
a nut body having a plurality of partially circumferential grooves each extending along a same circumference, from a seat surface of the lock nut to a circumferential edge of a threaded hole,
wherein each of a plurality of projections is disposed between two of the plurality of grooves and is made from the same material as that of the nut body and comprises:
an arcuate outer side face above the seat surface, from an intersection of the seat surface and an outer circumference corresponding to each of the plurality of partially circumferential grooves and toward a center of the nut body,
and an inner side face being an extension of an inner face of said threaded hole, and
a base portion extending radially along the groove from the outer circumferential radius to the threaded hole,
wherein a depth of said grooves is configured such that when said nut body is threadably engaged with a bolt and fastened against a head of the bolt, each of the plurality of projections is crushed and does not enter a space between a seat surface the head of the bolt and the seat surface of the nut body.

2. A lock nut according to claim 1, wherein an extremity of each of said projections is formed with a claw directed toward a center of said nut body.

3. A lock nut according to claim 1, wherein each of said projections has a screw thread being formed on said inner side face and threadably engageable with a threaded part of said bolt.

4. A lock nut according to claim 1, configured to connect a fastening nut to the side of each of said projections of said nut body; and wherein a height of each of said projections is set so that a lead angle and a pitch clearance of the threaded hole of said nut body coincide with a lead angle and a pitch clearance of a threaded hole of said fastening nut.

5. A lock nut according to claim 1, wherein the height of each of said projections is equal to or more than 30% of a length of said nut body in the direction of its central axis.

6. A lock nut according to claim 1, wherein each of said projections has a tapered mountain-shaped form.

7. A lock nut according to claim 2, wherein each of said projections has a screw thread being formed on said inner side face and threadably engaged with a threaded part of said bolt.

8. A lock nut according to claim 2, configured to connect a fastening nut to the side of each of said projections of said nut body; and wherein a height of each of said projections is set so that a lead angle and a pitch clearance of the threaded hole of said nut body coincide with a lead angle and a pitch clearance of a threaded hole of said fastening nut.

9. A lock nut according to claim 3, configured to connect a fastening nut to the side of each of said projections of said nut body; and wherein a height of each of said projections is set so that a lead angle and a pitch clearance of the threaded hole of said nut body coincide with a lead angle and a pitch clearance of a threaded hole of said fastening nut.

10. A lock nut according to claim 7, configured to connect a fastening nut to the side of each of said projections of said nut body; and wherein a height of each of said projections is set so that a lead angle and a pitch clearance of the threaded hole of said nut body coincide with a lead angle and a pitch clearance of a threaded hole of said fastening nut.

11. A lock nut according to claim 2, wherein the height of each of said projections is equal to or more than 30% of a length of said nut body in the direction of its central axis.

12. A lock nut according to claim 3, wherein the height of each of said projections is equal to or more than 30% of a length of said nut body in the direction of its central axis.

13. A lock nut according to claim 4, wherein the height of each of said projections is equal to or more than 30% of a length of said nut body in the direction of its central axis.

14. A lock nut according to claim 7, wherein the height of each of said projections is equal to or more than 30% of a length of said nut body in the direction of its central axis.

15. A lock nut according to claim 8, wherein the height of each of said projections is equal to or more than 30% of a length of said nut body in the direction of its central axis.

16. A lock nut according to claim 9, wherein the height of each of said projections is equal to or more than 30% of a length of said nut body in the direction of its central axis.

17. A lock nut according to claim 10, wherein the height of each of said projections is equal to or more than 30% of a length of said nut body in the direction of its central axis.

18. A lock nut according to claim 2, wherein each of said projections has a tapered mountain-shaped form.

19. A lock nut according to claim 3, wherein each of said projections has a tapered mountain-shaped form.

20. A lock nut according to claim 4, wherein each of said projections has a tapered mountain-shaped form.

* * * * *